March 24, 1970 A. H. BOBECK ET AL 3,503,054

DOMAIN WALL PROPAGATION IN MAGNETIC SHEETS

Filed Oct. 12, 1967 2 Sheets-Sheet 1

INVENTORS: A. H. BOBECK
W. J. TABOR
A. A. THIELE

BY Herbert M. Shapiro

ATTORNEY

DOMAIN WALL PROPAGATION IN MAGNETIC SHEETS

Filed Oct. 12, 1967 2 Sheets-Sheet 2

3,503,054
DOMAIN WALL PROPAGATION IN MAGNETIC SHEETS

Andrew H. Bobeck, Chatham, William J. Tabor, New Providence, and Alfred A. Thiele, East Orange, N.J., assignors to Bell Telephone Laboratories, Incorporated, Murray Hill and Berkeley Heights, N.J., a corporation of New York Filed Oct. 12, 1967, Ser. No. 674,832
Int. Cl. G11c *11/14, 19/00*
U.S. Cl. 340—174 10 Claims

ABSTRACT OF THE DISCLOSURE

Signal wall domains are moved from position to position in a sheet of magnetic material in response to consecutively offset propagation fields. A spatially varying bias field in the sheet enhances the propagation operation by providing preferred positions for the domains so moved. Various techniques for providing the varying bias are described.

FIELD OF THE INVENTION

This invention relates to devices in which single wall, reverse-magnetized domains are moved in a magnetic sheet in response to offset propagation fields in excess of a propagation threshold.

BACKGROUND OF THE INVENTION

Copending application Ser. No. 579,931, (now U.S. Patent 3,460,116) filed Sept. 16, 1966 for A. H. Bobeck, U. F. Gianola, R. C. Sherwood, and W. Shockley, describes a two-dimensional shift register device in which single wall domains are moved in a magnetic sheet. As disclosed therein, the sheet is, illustratively, isotropic in the plane of the sheet having a preferred direction of magnetization normal to the plane of the sheet. The rare earth orthoferrites are illustrative of the materials useful to this end.

There are what may be thought of as two distinct modes of operating such devices. Copending application Ser. No. 644,351 filed June 7, 1967, for A. H. Bobeck and R. F. Fischer, and copending application Ser. No. 657,877, filed Aug. 2, 1967, for A. H. Bobeck, H. E. D. Scovil, and W. Shockley describe, respectively, a propagation arrangement and a mode of performing logic in a sheet of magnetic material with a single wall domain which retains a stable diameter during operation. The latter copending application also discloses a mode of performing logic wherein the domain changes its shape. The mode wherein the domain is of stable geometry is called the "bias-dominated" mode because more practical embodiments thereof employ a bias field of a polarity tending to collapse the domains. The mode wherein the domain changes its geometry is called the "coercivity-dominated" mode because the coercivity of the sheet in which the domains are moved is sufficiently high in such cases to keep the domain in its attained shape when distorting fields are removed.

The designations of the two modes perhaps indicate oversimplifications of the interrelationships between the various material, sheet geometry, and operating parameters. The various relationships however may be calculated in accordance with well understood considerations related to wall energy and magnetostatic energy functions. For any particular magnetic material, the modes of operation can be demonstrated experimentally by making sheets having different thicknesses of from a high value where the operation is dominated by the bias to a relatively low value where the operation is dominated by the coercivity of the sheet. Each mode of operation is adaptable in accordance with this invention.

Next adjacent single wall domains have been found to repulse one another because of their like oriented dipole moments. In addition, material nonuniformities and defects, and wiring nonuniformities sometimes cause domains to be moved to positions slightly offset from desired locations for those domains. Allowance is made, usually, to minimize these effects in multiposition structures for propagating single wall domains. However, increased packing density is always desirable and those allowances are usually at the expense of packing density. The problem becomes more acute as submil size domains are employed.

An object of this invention then is to provide a domain propagation device capable of high packing densities.

In accordance with this invention, a spatially varying bias field is provided in a magnetic sheet, in which single wall domains can be moved, in a manner such that peaks in the bias field are surrounded by potential troughs. The domains, which are, illustratively, of stable geometry in this mode, tend to "lock up" on the field peaks. Operating margins and packing densities are improved in this manner.

In one embodiment, a sheet of rare earth orthoferrite has contiguous thereto a magnetic tape having a relative high coercive force of about 200 oersteds. Localized regions of reverse magnetization in the tape are in a direction to impose a localized bias on domains in corresponding positions in the contiguous orthoferrite sheet.

DETAILED DESCRIPTION

Figure 1:
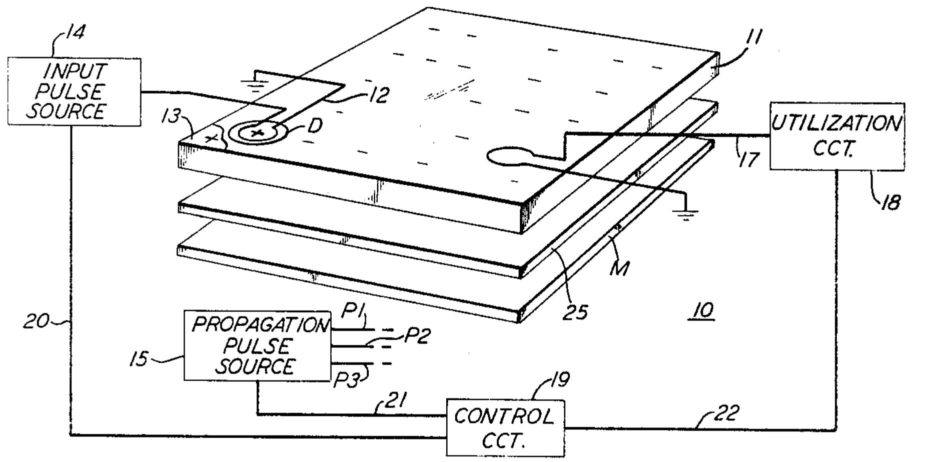
FIG. 1 is a schematic, partially exploded view of a two-dimensional shift register arrangement in accordance with this invention.

FIG. 1 shows an arrangement 10 including a magnetic sheet 11 in which single wall domains can be moved in response to offset propagation fields.

A representative conductor 12 is shown coupled to an input position in sheet 11 for the purpose of separating a single wall domain D from a source 13 of positive (+) magnetization as discussed in the aforementioned Bobeck-Gianola-Sherwood-Shockley application. In this connection, the sheet 11 is assumed saturated in a downward direction designated "negative" (−) and the source 13 and the single wall domains are assumed to include flux directed upward, designated "positive," as viewed in FIG. 1. Conductor 12 is connected between an input pulse source 14 and ground.

A domain is moved in any direction toward output positions in sheet 11. The means for so moving the domains typically includes consecutive offset conductors for producing consecutively offset fields along a selected direction in the sheet when pulsed. The conductors are represented by discontinuous lines P1, P2, and P3. The shape and function of the conductors represented by those lines are discussed fully in the above Bobeck-Gianola-Sherwood-Shockley application. Lines P1, P2, and P3 are connected between a propagation pulse source 15 and ground (not shown).

An output position in sheet 11 is coupled by a representative output conductor 17 which is connected between a utilization circuit 18 and ground.

The sources 14 and 15 and circuit 18 are connected to a control circuit 19 by representative conductors 20, 21, and 22, respectively. The various sources and circuits may be any such elements capable of operating in accordance with this invention.

Only a single domain propagation channel has been described. In that channel, a single wall domain is moved from one position to the next by an attracting field at that next position. It is in this manner that the domains are moved between input and output positions. The sheet 11, however, typically includes a matrix of positions (not shown). Further, the propagation conductors represented by lines P1, P2, and P3 couple sheet 11 in a manner to move a domain to any next adjacent positions in a matrix of positions in sheet 11. Therefore, sheet 11 includes a plurality of intersecting propagation channels each one of which may include an input and output arrangement of which conductors 12 and 17 are representative, respectively.

In most of the embodiments of this invention an additional sheet is employed contiguous the sheet (11) in which single wall domains are moved. As will become clear, this is not always the case. Further, in each embodiment a uniform bias may or may not be present in accordance with considerations dictating the mode of operation desired as described above. Whether a uniform bias is present or not, spatial variations in the bias effective in sheet 11 are necessary in accordance with this invention. In some embodiments, a uniform bias is assumed absent and fixed magnetic poles in the contiguous sheet provide the spatially varying magnetic field. In others, apertures in sheet 11 or in the contiguous sheet modify the uniform bias applied by a separate means such as a magnet as indicated by block M in FIG. 1. Each embodiment described may be modified to operate without or with a uniform bias as the case may be.

The embodiments wherein a uniform bias is assumed absent are described first. A sheet 25 is contiguous sheet 11. Sheet 25 comprises a magnetic film of, for example, iron oxide having a coercive force relatively high with respect to that of sheet 11. Consequently, any localized magnetic regions in film 25 remain fixed in position when propagation fields are applied to sheet 11. Rather than relying solely on high coercive force materials for sheet 11, that sheet may comprise, alternatively, a sheet of a nonmagnetic material such as glass in which holes are drilled. The holes than may be filled with magnetic material magnetized to provide a field which is maximum at domain positions in sheet 11 and which falls off rapidly outside those positions.

Figure 2:
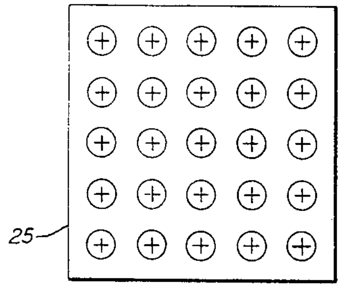
FIG. 2 is a top view of a portion of the arrangement of FIG. 1.
Figure 4:
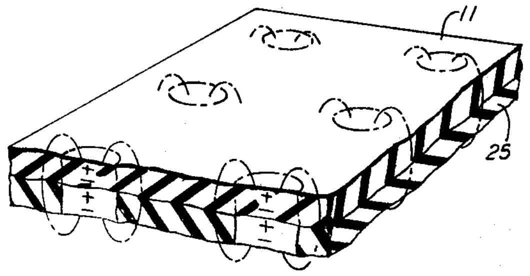
FIGS. 4 and 5 are plan view of portions of the arrangement of FIG. 1.
Figure 3:
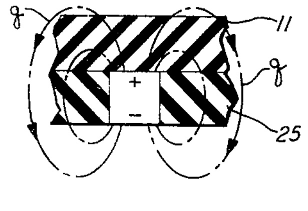
FIG. 3 is a cross-sectional view of a portion of the arrangement of FIG. 1.

FIG. 2 is a top view of sheet 25 as viewed in FIG. 1. The encircled plus signs indicate that the positive pole of each magnetized region in sheet 25 is toward sheet 11 and the negative pole is away from sheet 11. This is better illustrated in FIG. 3 which shows a "dipole" in sheet 25 with the negative pole downward and the positive pole upward toward sheet 11. Flux lines *q* in FIG. 3 indicate the field effective in a corresponding domain position of sheet 11. Flux closure is localized as illustrated in FIG. 4 for several magnetized areas of sheet 25. But distributed flux closure is feasible and other embodiments suggest themselves to this end.

For experimental purposes, it is advantageous to employ for sheet 25 a material which is transparent to (visible) light because it is convenient to view the movement of domains and the effect of the overlay on that movement by optical means. Accordingly, for experimental purposes, one-half mil holes have been drilled in a glass sheet on three mil centers and the holes have been filled with a magnetic colloid of iron oxide which then is magnetized in an appropriate direction as shown in FIG. 4.

In practice, the nonuniform bias field may be realized by means of contiguous sheets relatively inexpensively. One convenient technique is simply to magnetize a magnetic tape by means of an appropriate magnetizing head as indicated above. Another is the evaporation on glass of magnetic dots having magnetic remanence normal to the plane of the dot. A further technique employs a properly magnetized, apertured, relatively high coercive force sheet in the form of a mesh. All that is necessary is that whatever the implementation, a spatially varying bias is provided in the sheet in which single wall domains are moved. Typically, the mean bias is about one-fourth of the absolute value of the saturation magnetization of the magnetic sheet and the variations need only be less than ten percent of that value.

Figure 5:
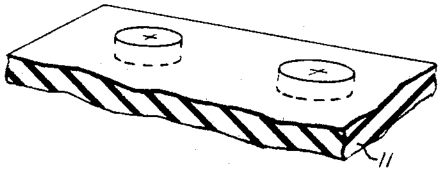
Figure 6:
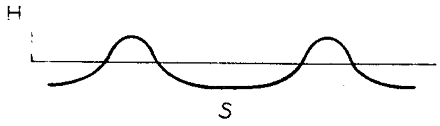
FIG. 6 is a graph of fields provided permanently in a portion of the arrangement of FIG. 1.

The effect of the fixed poles of sheet 25 is explained in connection with FIGS. 5 and 6. FIG. 5 illustrates two adjacent single wall domains with like signs representing the like dipole moments. It is clear that the domains will repel each other. FIG. 6 shows a graph of field H versus distance S from the center of a position for a domain. The curve indicates that preferred sites are provided for domains in sheet 11 by the fixed poles in sheet 25. Specifically, "hillocks" and "valleys" in the bias H are shown. The hillocks represent attracting fields which, to a degree, override the repulsion forces between adjacent domains providing preferred positions which permit adjacent domains to be more closely spaced. The domains lock into those positions when a perhaps misplaced propagation field moves a domain to the locality of an appropriate hillock.

It is assumed illustratively that a uniform bias is absent in the above embodiments. However, the hillocks may represent a field still of a polarity (negative) to collapse domains but relatively positive with respect to the remainder of a uniform bias field if such a bias field were present.

The hillocks may be quite closely spaced, leading to high packing densities. A magnetic tape, for example, may be magnetized in areas of 0.3 mil spaced apart 1.0 mil in accordance with present-day techniques. Accordingly, packing densities of $10^6$ domains per square inch can be achieved with single wall domains having diameters of 0.3 mil.

Increased drive fields may be expected in order to overcome the spatially varying bias in accordance with this invention. But, nonuniformity of bias permits larger packing densities and also the use of domains with smaller diameters. As the domains become smaller, the current required to move them becomes smaller, all else being equal.

Figure 7:
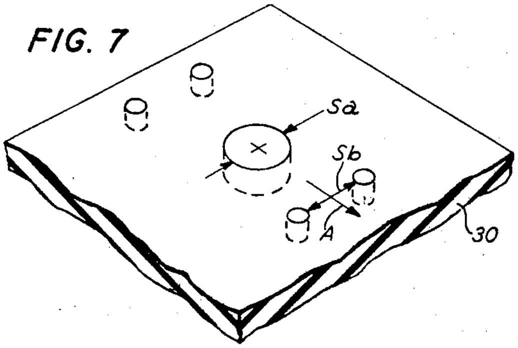

FIG. 7 shows an alternative arrangement in accordance with this invention wherein a uniform bias is present. In this arrangement, the magnetic sheet 30 in which single wall domains are moved includes apertures spaced apart such that next adjacent apertures along a line perpendicular to the direction of movement of a domain illustratively are less than the diameter of the domain distant from one another. The domain propagation from one position to the next now requires the domain to pass a constriction and "pop" into the next possible position. The direction of domain motion is shown by the arrow A in FIG. 7. The domain diameter is designated Sa. The distance between adjacent apertures is designated Sb and is less than Sa, illustratively. The spacing, however, need not be less than the domain diameter to provide an impedance to domain motion.

The apertures in sheet 11 need not penetrate the sheet. The apertures need merely provide high reluctance air gaps which distort a uniform bias field to provide the desired variation. The uniform bias is provided conveniently by means of magnet M in FIG. 1.

Figure 8:
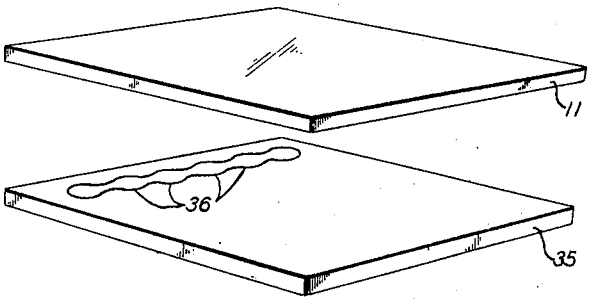

Another alternative arrangement is shown in FIG. 8. A sheet 35 of high permeability material is placed adjacent sheet 11. Sheet 35, however, is apertured, conveniently by laser cutting techniques to provide overlapping holes 36 producing a chain of figure 8 designs along a propagation path.

Sheet 35 is chosen of a thickness sufficient to provide mechanical strength. The apertures 36 are cut with diameters conveniently about three times the thickness of sheet 11 and do not penetrate sheet 35. The apertures in sheet 35 present a high reluctance in the presence of a bias field. Flux concentrates about the edge of each hole providing a field configuration which keeps the domain centered above the hole. Consequently, domain positions are well defined in sheet 11 by the apertures in sheet 35.

The requirement of a variable bias field in the magnetic material, in which single wall domains are moved, is met by spatially fixed poles attractive to domains in the absence of a uniform bias as described in connection with FIGS. 2 through 6. A like effect is achieved by a distribution of poles of a polarity to repel domains. The latter is similar to the effect achieved with apertures as discussed in connection with FIGS. 7 and 8. A particularly desirable result is achieved if a distribution of both types of poles is utilized.

Figure 9:
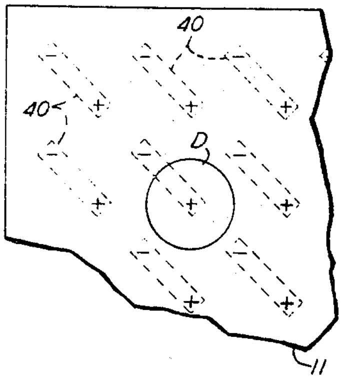
FIGS. 7, 8, and 9 are schematic representations of alternative arrangements in accordance with this invention.

FIG. 9 shows an illustrative distribution of plus (attractive) and minus (repelling) poles superimposed on a sheet of material 11 in which domains are moved. The domains, i.e., domain D, are assumed positive as described hereinbefore and thus tend to "lock up" on the like poles as shown. The negative poles are distributed about the preferred positions for domains as shown.

The pole distribution shown in FIG. 9 is achieved in a practical manner simply by depositing, in a well known manner, tiny bar magnets on the surface of the sheet 11. The bar magnets are indicated by the broken closed lines 40 encompassing plus signs at one end and minus signs at the other.

What has been described is considered only illustrative of the principles of this invention. Accordingly, various modifications may be made therein by one skilled in the art without departing from the scope and spirit of the invention.

What is claimed is:

1. A combination comprising a first sheet of material in which single wall domains can be moved, input means for providing a single wall domain at an input position in said sheet, propagation means for controllably moving said domain in said sheet to an output position, means for providing in said sheet a substantially uniform bias field of a polarity to constrict domains, and means for providing in said sheet between said input and output positions fixed stable positions between which said domains can be propagated, said last-mentioned means comprising means for imposing a like steady variation in said bias field locally at each of said positions.

2. A combination in accordance with claim 1 wherein said last-mentioned means comprises a second sheet of high permeability material having apertures therein.

3. A combination in accordance with claim 1 wherein said last-mentioned means comprises an apertured sheet of magnetic material.

4. A combination in accordance with claim 1 wherein said bias field is about one-fourth of the saturation magnetization of said first sheet said steady variation being less than about ten percent.

5. A combination in accordance with claim 1 wherein said last-mentioned means comprises a second sheet of material contiguous said first and including a plurality of spaced apart dipoles.

6. A combination in accordance with claim 5 wherein said second sheet comprises a magnetic material having a coercive force relatively high with respect to that of said first sheet.

7. A combination in accordance with claim 5 wherein said second sheet comprises nonmagnetic material and includes a plurality of apertures each filled with a magnetic material forming one of said dipoles.

8. A combination in accordance with claim 5 wherein said second sheet includes a plurality of discrete spots of magnetic material each forming one of said dipoles.

9. A combination in accordance with claim 1 wherein said last-mentioned means comprises a plurality of apertures in said first sheet spaced apart in a direction perpendicular to the direction of propagation of a domain a distance such that those apertures impede the propagation of said domain, and means for providing a uniform bias in said first sheet.

10. A combination in accordance with claim 9 wherein said last-mentioned means comprises a plurality of apertures in said first sheet spaced apart in a direction perpendicular to the direction of propagation of a domain a distance less than the diameter of a stable single wall domain in said first sheet.

References Cited

UNITED STATES PATENTS 3,114,898 12/1963 Fuller ------------- 340—174

BERNARD KONICK, Primary Examiner

G. M. HOFFMAN, Assistant Examiner